United States Patent

Oki et al.

[11] Patent Number: 6,027,222
[45] Date of Patent: Feb. 22, 2000

[54] BACK LIGHT DEVICE FOR CRYSTAL LIQUID DISPLAY

[75] Inventors: Yoji Oki; Kenichi Inoue, both of Kanagawa-ken, Japan

[73] Assignee: Stanley Electric Co., Ltd., Tokyo, Japan

[21] Appl. No.: 09/108,740

[22] Filed: Jul. 1, 1998

[30] Foreign Application Priority Data

Jul. 4, 1997 [JP] Japan ............................. 9-179736

[51] Int. Cl.⁷ ............................................ F21V 7/04
[52] U.S. Cl. ............................. 362/31; 362/26; 362/27; 362/330; 362/331; 362/339; 385/146
[58] Field of Search .................... 362/31, 26–30, 362/326–328, 330, 331, 339, 223; 359/707; 385/146

[56] References Cited

U.S. PATENT DOCUMENTS 5,408,388  4/1995  Kobayashi et al. .................. 362/31
5,831,774  11/1998  Toshima et al. ...................... 359/707
5,890,791  4/1999  Saito .................................... 362/31

FOREIGN PATENT DOCUMENTS 5-203947  8/1993  Japan .

*Primary Examiner*—Cassandra Spyrou
*Assistant Examiner*—Craig H. Curtis
*Attorney, Agent, or Firm*—Weingarten, Schurgin, Gagnebin & Hayes LLP

[57] ABSTRACT

A back light device for a liquid crystal display is provided, which comprises diffusing prisms formed on the surface of the light guide plate, and the apical angle of the diffusing prism is set in the range of 65–85 degrees for a uniform and brighter illumination using the same light source.

8 Claims, 5 Drawing Sheets

BACK LIGHT DEVICE FOR CRYSTAL LIQUID DISPLAY

BACKGROUND OF THE INVENTION

1. Field of the Invention

The present invention relates to a back light device for a liquid crystal display. More specifically, the present invention relates to a back light device used for a transparent type lighting of a liquid crystal display adopted as a display for a mobile personal computer or other equipment.

2. Background Art

An example of the back light device for a liquid crystal display mentioned above in the prior art is disclosed in Japanese unexamined patent publication No. Hei 5-203947. In this publication, the back light device 90 includes a light guide plate 91 that is made of a transparent material such as an acrylic resin, and has a shape of substantially thick plate. One or each end side (not illustrated) of the thick plate is provided with a tubular light source 92 such as a cold cathode lamp that is disposed adjacent to the end side for emitting light into the light guide plate 91.

The back surface of the light guide plate 91 is provided with a reflecting surface 93 by applying a white paint, for example. The reflecting surface 93 works for directing the light to the front surface that has reached the back surface (reflecting surface 93) out of the light lead into the light guide plate 91 from the light source 92. The front surface of the light guide plate 91 is provided with a plurality of diffusing prisms 91a having a substantially isosceles triangle section and a ridge extending along the direction perpendicular to the axis Z of the light source 92.

The diffusing prisms 91a direct the light to the outside from the surface as a substantially diffused light that has reached the diffusing prism 91a directly from the light source 92 or has been reflected by the reflecting surface 93. However, diffusion effect thereof is not sufficient only by the diffusing prism 91a. Therefore, a diffusing sheet 94, prism sheet 95 or other members having diffusion effect is disposed between the light guide plate 91 and a liquid crystal display 80 located in the front side of the light guide plate 91. Thus, more diffused light passes through and illuminates the liquid crystal display 80.

However, in the above mentioned back light device 90 of the prior art, the diffusing prisms 91a formed on the surface of the light guide plate 91 have not been fully examined about its shape. For example, the apical angle of the isosceles triangle section of the diffusing prism 91a was set at 90 degrees for reasons such as an easiness for making a mold of the light guide plate 91. Therefore, it was a problem to be improved that the liquid crystal display was not always illuminated under the best condition.

SUMMARY OF THE INVENTION

To solve the above mentioned problem in the prior art, the present invention provides a back light device for a liquid crystal display, which comprises a light guide plate, one or more tubular light source disposed closely to at least one end side of the light guide plate, and a plurality of diffusing prisms formed on the surface of the light guide plate, having a substantially isosceles triangle section and a ridge extending along the direction perpendicular to the axis of the tubular light source, in which the apical angle of the diffusing prism is set in the range of 65–85 degrees.

BRIEF DESCRIPTION OF THE DRAWINGS

These and other objects and advantages of the present invention will become clear from the description with reference to the accompanying drawings, wherein.

DETAILED DESCRIPTION OF THE PREFERRED EMBODIMENTS

The present invention is described in detail hereinafter with reference to an embodiment shown in the accompanying drawings.

Figure 1:
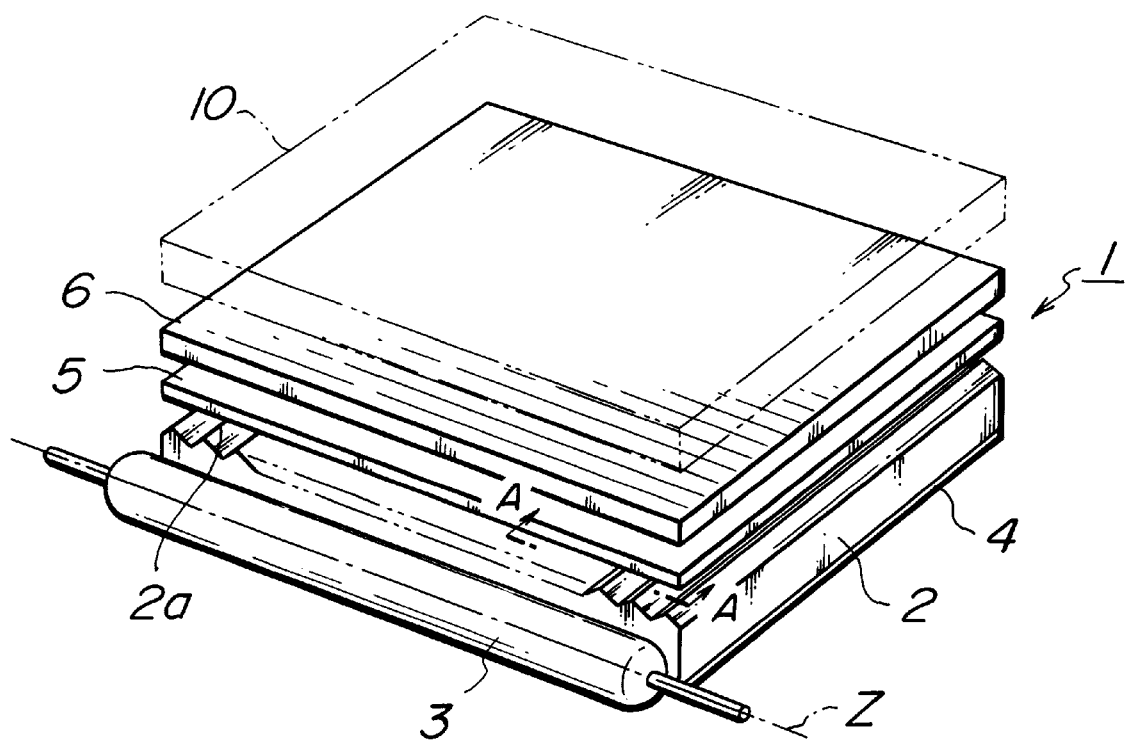
FIG. 1 is a perspective view of an embodiment of back light device for a liquid crystal display according to the present invention.
Figure 2:
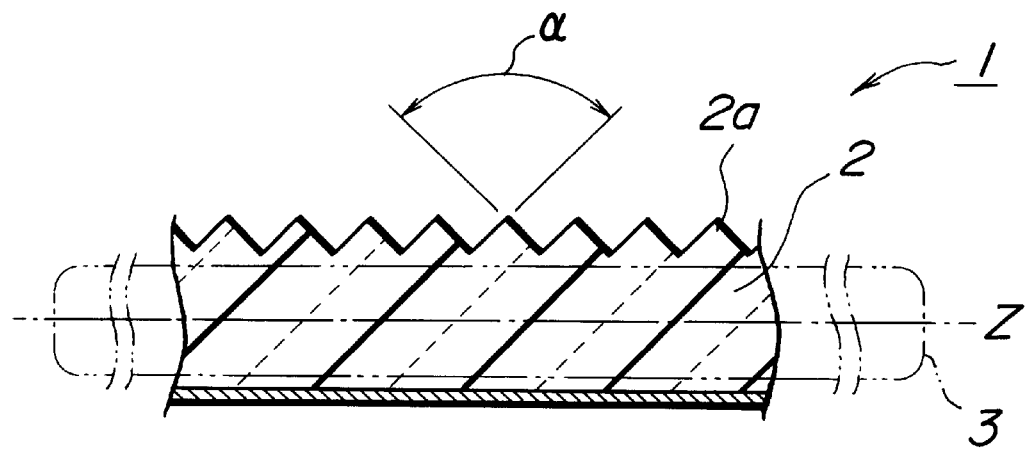
FIG. 2 is a cross section along A—A line in the FIG. 1.

In FIGS. 1 and 2, reference numeral 1 denotes a back light device for a liquid crystal display according to the present invention. This back light device 1 comprises a light guide plate 2 that is made of a transparent material such as an acrylic resin, and has a shape of substantially thick plate. One or each end side of the light guide plate is provided with a light source 3 such as a cold cathode fluorescent lamp.

The back surface of the light guide plate is provided with a reflecting surface 4, and the front surface of the light guide plate is provided with a plurality of diffusing prisms 2a having a substantially isosceles triangle section and a ridge extending along the direction perpendicular to the axis Z of the light source 3. In the present invention, the apical angle α of the diffusing prism having the isosceles triangle section (See FIG. 2) is limited to a proper range so that the optimal illumination condition is obtained for the liquid crystal display 10.

Figure 3:
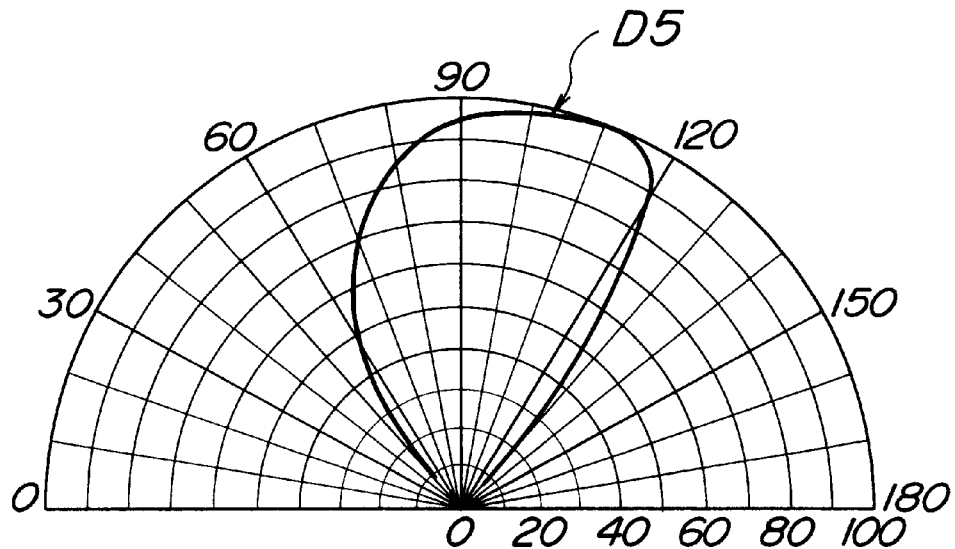
FIG. 3 is a graph showing a distribution character of the light emitted from the light guide plate when the apical angle of the diffusing prism is set at 50 degrees.
Figure 4:
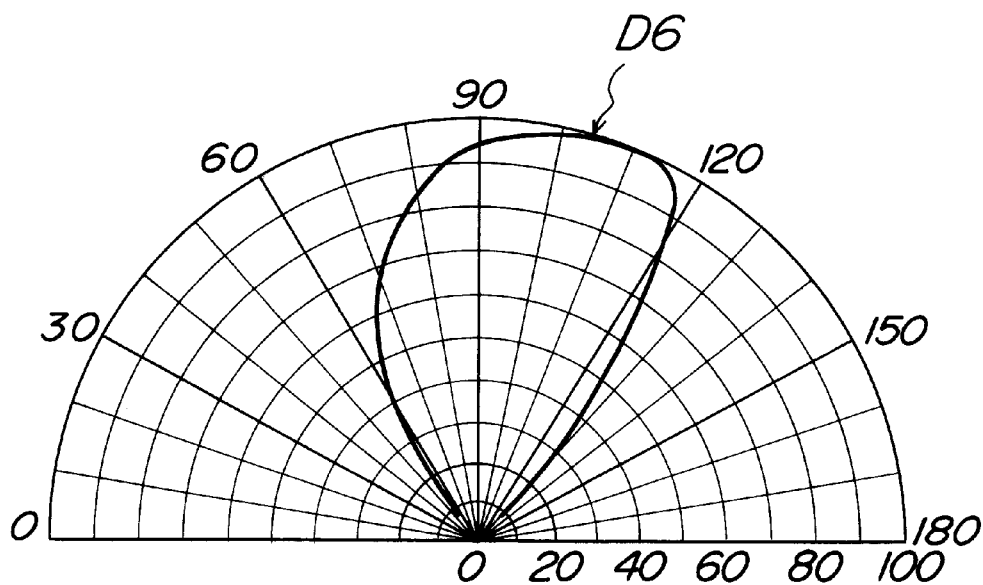
FIG. 4 is a graph showing a distribution character of the light emitted from the light guide plate when the apical angle of the diffusing prism is set at 60 degrees.
Figure 5:
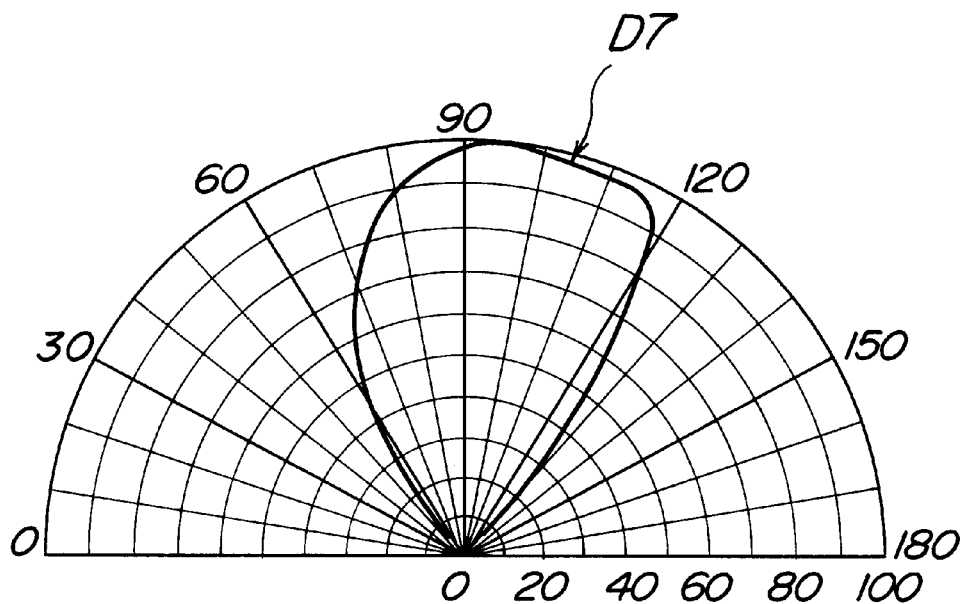
FIG. 5 is a graph showing a distribution character of the light emitted from the light guide plate when the apical angle of the diffusing prism is set at 70 degrees.
Figure 6:
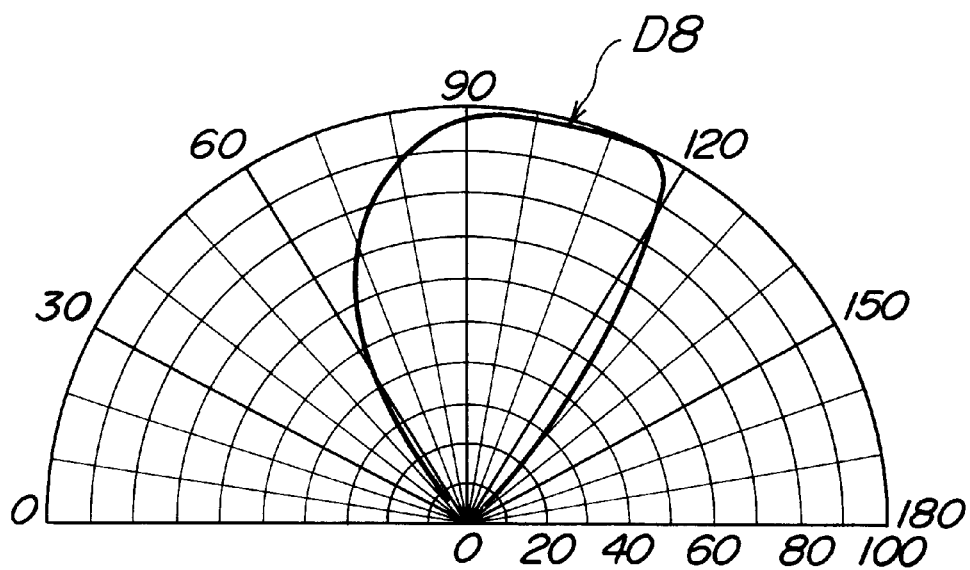
FIG. 6 is a graph showing a distribution character of the light emitted from the light guide plate when the apical angle of the diffusing prism is set at 80 degrees.
Figure 7:
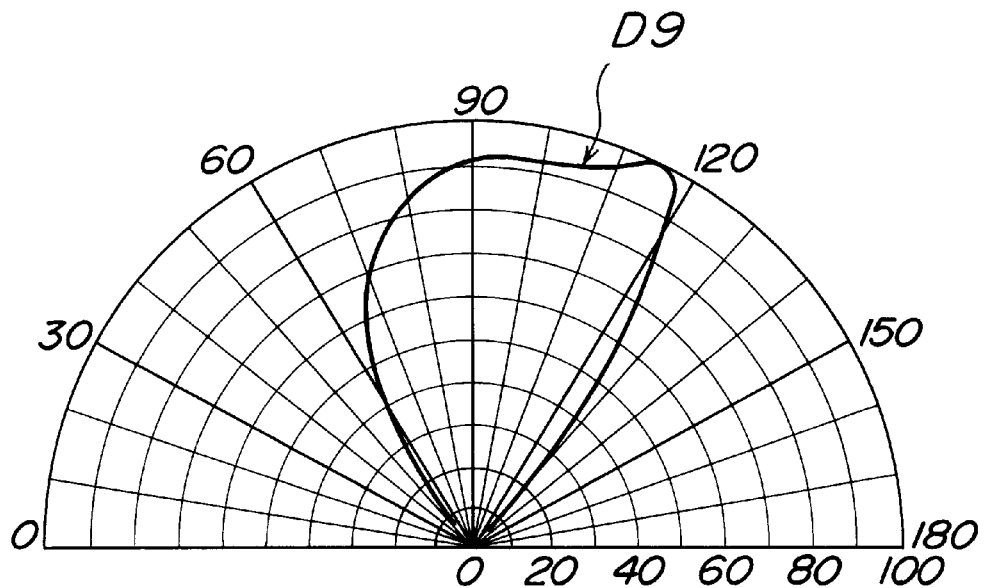
FIG. 7 is a graph showing a distribution character of the light emitted from the light guide plate when the apical angle of the diffusing prism is set at 90 degrees.
Figure 8:
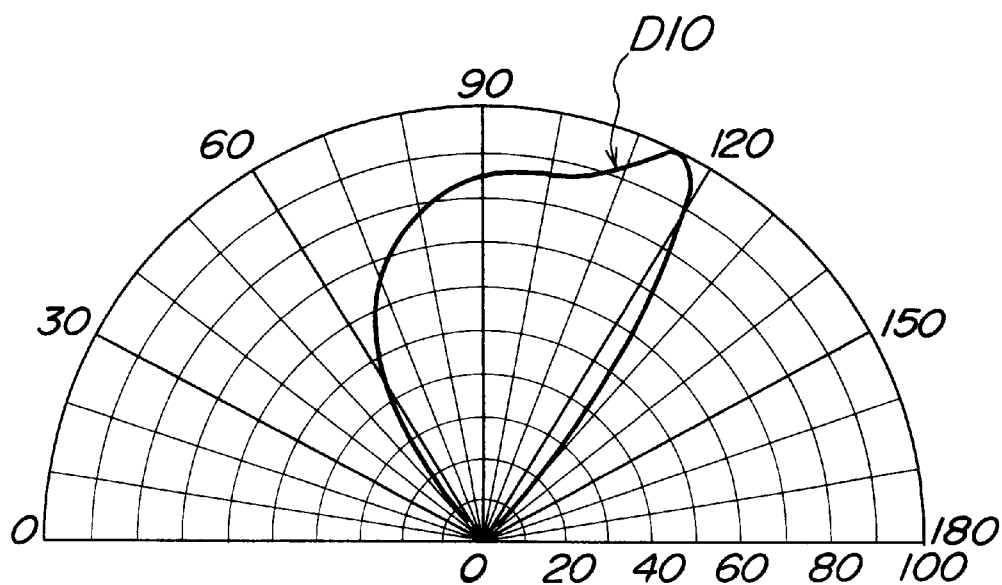
FIG. 8 is a graph showing a distribution character of the light emitted from the light guide plate when the apical angle of the diffusing prism is set at 100 degrees.

FIGS. 3–8 are graphs showing a result of an experiment performed by the inventor for finding the optimum illumination condition for the liquid crystal display 10. FIG. 3 shows a distribution character D5 of the light emitted from the back light device 1 when the apical angle α is set at 50 degrees. In the same way, FIG. 4–8 show distribution characters D6–D10 of the light when the apical angle α is set at 60, 70, 80, 90 and 100 degrees, respectively.

In the measurement of the light distribution characters D5–D10, a diffusing sheet 5 and prism sheet 6 were placed between the light guide plate 2 and the liquid crystal display 10 for adjustment of the actual operating condition of the liquid crystal display. The diffusing sheet 5 and the prism sheet 6 were set in the same condition with respect to the apical angle α.

Figure 9:
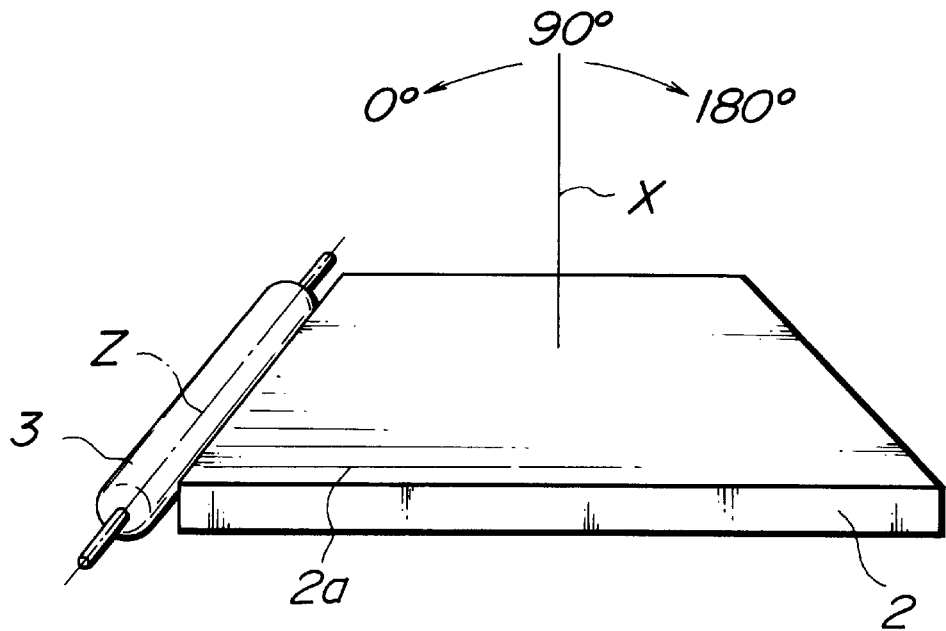
FIG. 9 shows a measurement of the distribution character of the light.
Figure 10:
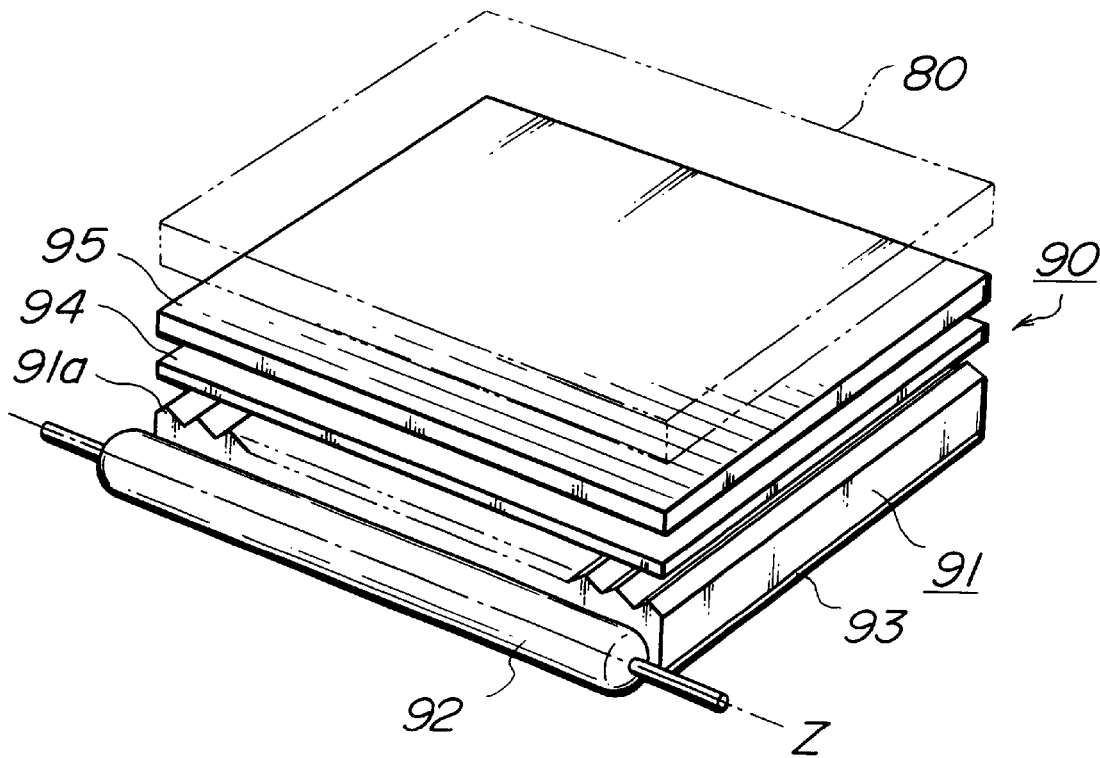
FIG. 10 is a perspective view of a back light device for a liquid crystal display in the prior art.

The light distribution characters D5–D10 were measured as an illuminance distribution along the ridge direction of the diffusing prism 2a as shown in FIG. 9. The light distribution angle is indicated as 0 degree at the side where the light source is disposed, and is indicated as 180 degrees as the opposite side. Therefore, the direction of normal X with respect to the surface of the light guide plate 2, which is the direction of illumination of the liquid crystal display, becomes 90 degrees.

Examining the light distribution characters D5–D10 mentioned above, it is understood that the maximum illuminance is obtained when the apical angle α is 70 degrees (at the light distribution characters D7) with respect to the direction of normal X that is the illumination direction of the liquid crystal display 10. Supposed the value of the light distribution characters D7 is 100%, the value of the light distribution characters D6 when the apical angle α is 60 degrees becomes 98%, and the value of the light distribution characters D5 when the apical angle α is 50 degrees becomes 95%. Thus, it was found that the illuminance becomes smaller as the apical angle α becomes narrower.

Furthermore, the value of the light distribution characters D8 when the apical angle α is 80 degrees becomes 99%, the value of the light distribution characters D9 when the apical angle α is 90 degrees becomes 97%, and the value of the light distribution characters D10 when the apical angle α is 100 degrees becomes 92%. Thus, it is confirmed that the illuminance becomes smaller as the apical angle α becomes wider than 70 degrees and that it is preferable that the apical angle α is 70 degrees in order to illuminate the liquid crystal display efficiently.

Examining the light distribution characters D5–D10, it is understood that each character is for illuminating a range of 65–125 degrees. However, the light distribution characters D7 and D8 can lead a uniform illuminance above 90% at a range 80–120 degrees, while in the light distribution characters D5 and D6 the uniformity of the illuminance at the same range falls to approximately 85%. Especially, in the light distribution characters D9 and D10, the remarkable peak appears at approximately 115 degrees.

In conclusion, when the light guide plate 2 for illuminating the liquid crystal display is provided with diffusing prisms 2a, it is confirmed that the apical angle α of the isosceles triangle section of the prism has an optimum value between 65 and 85 degrees for uniform and sufficient illumination.

As mentioned above, a back light device for a liquid crystal display according to the present invention comprises a plurality of diffusing prisms formed on the surface of the light guide plate, and the apical angle α of the isosceles triangle section of the diffusing prism is in the range of 65–85 degrees. Thus, the brighter and more uniform illumination of the liquid crystal display can be obtained using the same light source as the prior art, and the excellent effect for improving a quality of display can be obtained.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A back light device for a liquid crystal display, comprising:
   a light guide plate;
   one or more tubular light sources disposed at one or more end surfaces of the light guide plate; and
   a plurality of diffusing prisms formed on a surface of the light guide plate, each of the diffusing prisms having a substantially isosceles triangle cross-section and a ridge extending along the direction perpendicular to the axis of the tubular light source, wherein the apical angle of each of the diffusing prisms is set in the range of 65–85 degrees.

2. The back light device for a liquid crystal display according to claim 1, wherein the apical angle of each of the diffusing prisms is set at 70 degrees.

3. The back light device for a liquid crystal display according to claim 1, wherein the surface on which the prisms are formed is at a light emitting side of the light guide plate, and further comprising a diffusing sheet disposed at the light emitting side of the light guide plate.

4. The back light device for a liquid crystal display according to claim 2, wherein the surface on which the prisms are formed is at a light emitting side of the light guide plate, and further comprising a diffusing sheet disposed at the light emitting side of the light guide plate.

5. The back light device for a liquid crystal display according to claim 1, wherein the surface on which the prisms are formed is at a light emitting side of the light guide plate, and further comprising a prism sheet disposed at the light emitting side of the light guide plate.

6. The back light device for a liquid crystal display according to claim 2, wherein the surface on which the prisms are formed is at a light emitting side of the light guide plate, and further comprising a prism sheet disposed at the light emitting side of the light guide plate.

7. The back light device for a liquid crystal display according to claim 3, further comprising a prism sheet disposed at the light emitting side of the light guide plate.

8. The back light device for a liquid crystal display according to claim 4, further comprising a prism sheet disposed at the light emitting side of the light guide plate.

* * * * *